(12) United States Patent
Takijiri et al.

(10) Patent No.: US 11,789,435 B2
(45) Date of Patent: Oct. 17, 2023

(54) FLOW CONTROL DEVICE, DIAGNOSTIC METHOD, AND PROGRAM FOR FLOW CONTROL DEVICE

(71) Applicant: HORIBA STEC, Co., Ltd., Kyoto (JP)

(72) Inventors: Kotaro Takijiri, Kyoto (JP); Kentaro Nagai, Kyoto (JP); Tsai Wei Tseng, Kyoto (JP)

(73) Assignee: HORIBA STEC, Co., Ltd., Kyoto (JP)

( * ) Notice: Subject to any disclaimer, the term of this patent is extended or adjusted under 35 U.S.C. 154(b) by 563 days.

(21) Appl. No.: 17/046,249

(22) PCT Filed: Apr. 1, 2019

(86) PCT No.: PCT/JP2019/014456
§ 371 (c)(1),
(2) Date: Oct. 8, 2020

(87) PCT Pub. No.: WO2019/202959
PCT Pub. Date: Oct. 24, 2019

(65) Prior Publication Data
US 2021/0173388 A1    Jun. 10, 2021

(30) Foreign Application Priority Data
Apr. 19, 2018 (JP) .................................. 2018-080891

(51) Int. Cl.
*G01F 25/10* (2022.01)
*G01F 1/36* (2006.01)
(Continued)

(52) U.S. Cl.
CPC ........... *G05B 23/0221* (2013.01); *G01F 1/34* (2013.01); *G01F 25/10* (2022.01); *G05D 7/0635* (2013.01)

(58) Field of Classification Search
CPC ... G01F 1/34; G01F 1/36; G01F 1/363; G01F 1/366; G01F 1/40; G01F 1/42; G01F 25/10
See application file for complete search history.

(56) References Cited

U.S. PATENT DOCUMENTS 5,669,408 A    9/1997  Nishino et al.
6,302,130 B1  10/2001  Ohmi et al.
(Continued)

FOREIGN PATENT DOCUMENTS

CN    101258456 A    9/2008
CN    101484859 A    7/2009
(Continued)

OTHER PUBLICATIONS

ISA Japan Patent Office, International Search Report Issued in Application No. PCT/JP2019/014456, dated Jun. 25, 2019. WIPO, 4 pages.
(Continued)

*Primary Examiner* — Herbert K Roberts
(74) *Attorney, Agent, or Firm* — Alleman Hall Creasman & Tuttle LLP

(57) ABSTRACT

Provided is a flow rate control device capable of diagnosing whether an abnormality has occurred while continuing to supply a predetermined flow rate. The flow rate control device calculates an inflow/outflow rate of a fluid into a volume on the basis of a downstream pressure that is the pressure in the volume; estimates a valve flow rate that is a flow rate of the fluid that flows out of the volume through the downstream valve on the basis of the resistance flow rate and the inflow/outflow flow rate; controls the downstream valve so that the difference between the set flow rate and the valve flow rate decreases; calculates a diagnostic parameter on the basis of the resistance flow rate or the inflow/outflow flow rate in a pressure change state in which the upstream side
(Continued)

pressure increases or decreases; and diagnoses an abnormality based on the diagnostic parameter.

9 Claims, 4 Drawing Sheets

(51) Int. Cl.
  *G05B 23/02* (2006.01)
  *G01F 1/34* (2006.01)
  *G05D 7/06* (2006.01)

(56) References Cited

U.S. PATENT DOCUMENTS

| | | | |
|---|---|---|---|
| 7,552,015 B2* | 6/2009 | Shajii | G01F 25/10 137/12 |
| 2006/0037644 A1* | 2/2006 | Nishikawa | G05D 7/0641 137/487.5 |
| 2009/0292399 A1 | 11/2009 | Nagase et al. | |
| 2009/0326719 A1 | 12/2009 | Nagase et al. | |
| 2010/0070240 A1* | 3/2010 | Yasuda | G01F 25/10 702/183 |
| 2013/0092256 A1 | 4/2013 | Yasuda et al. | |
| 2013/0092258 A1* | 4/2013 | Yasuda | G01F 1/6842 137/487 |
| 2013/0174635 A1* | 7/2013 | Yasuda | G01F 25/15 73/1.16 |
| 2017/0293309 A1* | 10/2017 | Kishine | G05D 16/0663 |
| 2018/0246533 A1* | 8/2018 | Somani | G01F 1/88 |
| 2018/0253111 A1* | 9/2018 | Goto | G01F 15/005 |
| 2018/0306615 A1* | 10/2018 | Ding | G01F 1/363 |
| 2019/0094847 A1* | 3/2019 | Nagase | G05B 23/0291 |
| 2019/0204128 A1* | 7/2019 | Somani | G01F 1/692 |
| 2020/0232873 A1* | 7/2020 | Nagase | G05D 7/0635 |
| 2021/0141399 A1* | 5/2021 | Sugita | F16K 31/004 |

FOREIGN PATENT DOCUMENTS

| | | |
|---|---|---|
| CN | 101529356 A | 9/2009 |
| JP | 2012237733 A | 12/2012 |
| JP | 2014063348 A | 4/2014 |
| WO | 2008053839 A1 | 5/2008 |
| WO | 2017057129 A1 | 4/2017 |
| WO | 2017170174 A1 | 10/2017 |
| WO | WO-2019190656 A1 * | 10/2019 ............ G01F 1/36 |

OTHER PUBLICATIONS

China National Intellectual Property Office, Office action issued in CN Application No. 201980025591.9, dated Jul. 13, 2023, 9 pages.

* cited by examiner

FLOW CONTROL DEVICE, DIAGNOSTIC METHOD, AND PROGRAM FOR FLOW CONTROL DEVICE

BACKGROUND OF THE INVENTION

Field of the Invention

This invention relates to a flow control device which has an abnormality diagnostic function.

Background Art

In a semiconductor manufacturing process, for example, a flow control device called a mass flow controller, in which various fluid devices and a control mechanism are packaged, is used to control the flow rate of various gases introduced into an etching chamber.

Concretely, a mass flow controller is equipped with a flow rate sensor and a control valve as fluid devices, and as a control mechanism is equipped with a flow rate control unit which controls the opening of the valve in order to reduce the deviation between a set flow rate and a flow rate measured by the flow rate sensor.

Incidentally, for example, if a component contained in a fluid which condensates easily adheres to the inside of a device which constitutes the flow rate sensor and an abnormality such as a blockage occurs, a measurement error is generated in the flow rate measured by the flow rate sensor. In order to prevent an inaccurate flow rate control from being continued in a state where this kind of measurement error has occurred, there is a mass flow controller equipped with a diagnostic unit which performs a self-diagnosis as to whether or not there is an abnormality of the sensor (see Patent Document 1).

When set to a self-diagnosis mode, the diagnostic unit fully closes the control valve and fills a reference volume of a tank or the like provided upstream of the mass flow controller with fluid until it reaches a certain pressure. Then, after the upstream side of the reference volume is fully closed by a separately provided on-off valve, the control valve is opened. In this process, a change in value is measured of the flow rate, pressure, and the like measured by the flow rate sensor which is the target for diagnosis. A value measured at this time is taken as a diagnostic parameter, and if there is a big difference in the value compared to the value during a normal time, the diagnostic unit determines that an abnormality has occurred in the flow rate sensor.

However, in the conventional diagnostic method described above, because it is necessary to fully close the flow path and put it into a state in which new fluid cannot be supplied in order to perform the self-diagnosis, it is not possible to continue supplying a desired set flow rate to the chamber while the self-diagnosis is being performed. Because of this, it has been necessary that the self-diagnosis be performed during a time when the manufacturing process is stopped, such as during maintenance.

Consequently, the condition of the flow rate sensor could not be understood except intermittently, and furthermore a decline in throughput was caused by the stopping of the manufacturing process during the period when the self-diagnosis was being performed.

PRIOR ART DOCUMENTS

Patent Documents

Patent Document 1: Japanese Patent Laid Open No. 2014-63348

SUMMARY OF THE INVENTION

Problems to be Solved by the Invention

The present invention has been made taking into account the above mentioned problems, and its object is to provide a flow control device which can diagnose whether or not an abnormality has occurred and the like while continuing to supply a predetermined flow rate.

Means of Solving the Problems

More specifically, a flow control device according to the present invention is one that comprises: a fluid resistor provided in a flow path; a downstream side valve provided on a downstream side of the fluid resistor; a resistance flow rate measurement mechanism which measures a resistance flow rate which flows through the fluid resistor and which flows into a volume in the flow path between the fluid resistor and the downstream side valve; an inflow/outflow flow rate calculation unit which calculates an inflow/outflow flow rate of the fluid into or out of the volume on the basis of a downstream side pressure which is a pressure inside the volume; a valve flow rate estimation unit which estimates a valve flow rate, which is a flow rate of the fluid flowing out from the volume and flowing through the downstream side valve, on the basis of the resistance flow rate and the inflow/outflow flow rate; a flow rate control unit which controls the downstream side valve so that a deviation between a set flow rate and the valve flow rate becomes small; a diagnostic parameter calculation unit which calculates a diagnostic parameter on the basis of the inflow/outflow flow rate or the resistance flow rate in a pressure change state of an increasing or decreasing of an upstream side pressure which is a pressure on an upstream side of the fluid resistor; and a diagnostic unit which diagnoses an abnormality on the basis of the diagnostic parameter.

Also, the diagnostic method according to the present invention is a diagnostic method used for a flow control device comprising a fluid resistor provided in a flow path, a downstream side valve provided on a downstream side of the fluid resistor, and a resistance flow rate measurement mechanism which measures a resistance flow rate which flows through the fluid resistor and which flows into a volume in the flow path between the fluid resistor and the downstream side valve, the diagnostic method comprising an inflow/outflow flow rate calculation step which calculates an inflow/outflow flow rate of a fluid into or out of the volume on the basis of a downstream side pressure which is a pressure inside the volume; a valve flow rate estimation step which estimates a valve flow rate which is a flow rate of the fluid flowing out from the volume and flowing through the downstream side valve on the basis of the resistance flow rate and the inflow/outflow flow rate; a flow rate control step which controls the downstream side valve so that a deviation between a set flow rate and the valve flow rate becomes small; a diagnostic parameter calculation step which calculates a diagnostic parameter on the basis of the inflow/outflow flow rate or the resistance flow rate in a pressure change state of increasing or decreasing of an upstream side pressure which is the pressure on an upstream side of the fluid resistor; and a diagnostic step which diagnoses an abnormality on the basis of the diagnostic parameter.

In such configurations, the downstream side valve continues to be controlled by the flow rate control unit, and it's possible to calculate the diagnostic parameter in a state where the fluid continues to be supplied at the set flow rate. Therefore, it's not necessary to fully close the flow path for diagnosis, and diagnosis becomes possible during operation time other than maintenance time.

Concretely, because the fluid control device controls the downstream side valve so that the valve flow rate estimated from the resistance flow rate and the inflow/outflow flow rate coincides with the set flow rate, for example, when the pressure on the upstream side of the fluid resistor changes, the influence of the change appears in the resistance flow rate and the inflow/outflow flow rate. Supposing a case where a measurement error is generated in the resistance flow rate, the diagnostic parameter based on a difference between the resistance flow rate and the inflow/outflow flow rate will become a value which differs from a value during a normal time. Consequently, while realizing a set flow rate via the downstream side valve, a diagnosis becomes possible thanks to the diagnostic unit.

If the set flow rate includes a constant flow rate section in which the a flow rate value is maintained at a constant value, it is possible to calculate the diagnostic parameter in a state in which the fluid is flowing stably, and thus it's difficult for influences other than an abnormality to appear in the diagnostic parameter, and it's possible to improve diagnostic accuracy.

In order to simplify the configuration for acquiring the resistance flow rate and the inflow/outflow flow rate, and also make it possible to perform a diagnosis while simultaneously supplying a fluid at a set flow rate, it's preferable that the resistance flow rate measurement mechanism comprise an upstream side pressure sensor, which is provided on the upstream side of the fluid resistor, and which measures the upstream side pressure which is the pressure on the upstream side of the fluid resistor; a downstream side pressure sensor, which is provided between the fluid resistor and the downstream side valve, and which measures the downstream side pressure; and a resistance flow rate calculation unit which calculates the resistance flow rate on a basis of the upstream side pressure and the downstream side pressure; and furthermore it's preferable that the inflow/outflow flow rate calculation unit is configured to calculate the inflow/outflow flow rate on the basis of the downstream side pressure measured by the downstream side pressure sensor; and the diagnostic unit diagnoses an abnormality of the resistance flow rate measurement mechanism.

In order to make it possible to determine whether or not there is an abnormality on the basis of a diagnostic parameter by a simple criterion, it's preferable that a reference value storage unit further be included which stores as a reference value a diagnostic parameter calculated during a normal state, which is calculated by the diagnostic parameter calculation unit, and that the diagnostic unit is one which determines whether or not there is an abnormality by comparing the diagnostic parameter and the reference value.

In order to realize, at an arbitrary timing, a pressure change state on the upstream side of the fluid resistor necessary for calculating a diagnostic parameter while improving the response speed of the valve flow rate, it's preferable to further include an upstream side valve provided on the upstream side of the fluid resistor, and a pressure control unit which controls the upstream side valve such that a deviation between a set pressure, which includes a pressure change section where the target pressure value is changing, and the upstream side pressure, which is the actually measured pressure on the upstream side of the fluid resistor, becomes small.

Concretely, a control configuration is given for performing an abnormality diagnosis while supplying the desired constant flow rate via the downstream side valve, in which the pressure control unit, during a state in which the downstream side valve is being controlled so that the valve flow rate is constant, continues increasing an opening of the upstream side valve for a fixed period of time, or continues decreasing the opening of the upstream side valve for a fixed period of time.

In order make it difficult for an erroneous determination to occur by preventing an influence from the transient response of the resistance flow rate and the inflow/outflow flow rate from arising in the diagnosis based on the diagnostic parameter, it's preferable that the diagnostic parameter calculation unit calculates the diagnostic parameter in a state in which the resistance flow rate and the inflow/outflow flow rate are respectively stable for a predetermined time.

For example, in order to retrofit the same diagnosis function as the present invention to existing control devices, a program used for a flow control device comprising a fluid resistor provided in a flow path, a downstream side valve provided on a downstream side of the fluid resistor, and a resistance flow rate measurement mechanism which measures a resistance flow rate which flows through the fluid resistor and which flows into a volume in the flow path between the fluid resistor and the downstream side valve may be installed, wherein the flow control device program causes a computer to function as an inflow/outflow flow rate calculation unit which calculates an inflow/outflow flow rate of a fluid into or out of the volume on the basis of a downstream side pressure which is the pressure inside the volume; a valve flow rate estimation unit which estimates a valve flow rate which is a flow rate of the fluid flowing out from the volume and flowing through the downstream side valve on the basis of the resistance flow rate and the inflow/outflow flow rate; a flow rate control unit which controls the downstream side valve so that a deviation between a set flow rate and the valve flow rate becomes small; a diagnosis parameter calculation unit which calculates a diagnostic parameter on the basis the inflow/outflow flow rate or the resistance flow rate in a pressure change state of an increasing or decreasing of an upstream side pressure which is a pressure of the upstream side of the fluid resistor; and a diagnostic unit which diagnoses an abnormality on the basis of the diagnostic parameter.

Moreover, the flow control device program may be electronically distributed, or may be recorded onto a program recording medium such as a CD, DVD, HDD, or flash memory.

Advantageous Effects of the Invention

As described above, according to the present invention, because it is configured to calculate the diagnostic parameter based on the resistance flow rate and the inflow/outflow flow rate for estimating the valve flow rate to be controlled, a diagnosis of an abnormality can be performed concurrently with the supplying of a desired set flow rate.

LIST OF REFERENCE CHARACTERS

Figure 1:
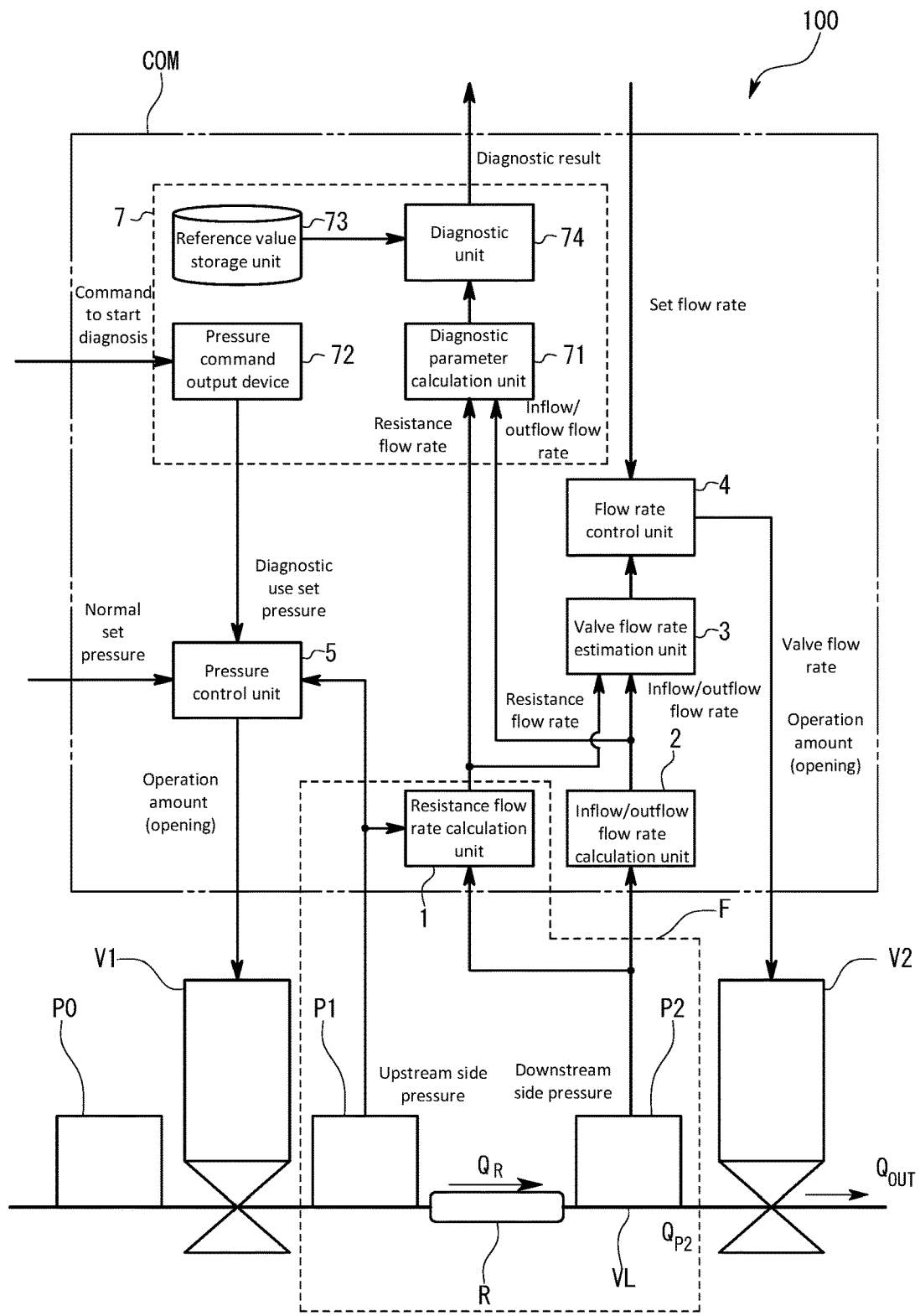
FIG. 1 is a schematic diagram illustrating the flow control device according to the first embodiment of the present invention.

100: Flow control device
V1: Upstream side valve
P1: Upstream side pressure sensor
R: Fluid resistor
VL: Downstream side volume
P2: Downstream side pressure sensor
V2: Downstream side valve
F: Flow rate measurement mechanism
1: Resistance flow rate calculation unit
2: Inflow/outflow flow rate calculation unit
3: Valve flow rate estimation unit
4: Flow rate control unit
5: Pressure control unit
7: Self-diagnostic mechanism
71: Diagnostic parameter calculation unit
72: Pressure command output device
73: Reference value storage unit
74: Diagnostic unit

DESCRIPTION OF EMBODIMENTS

Figure 2:
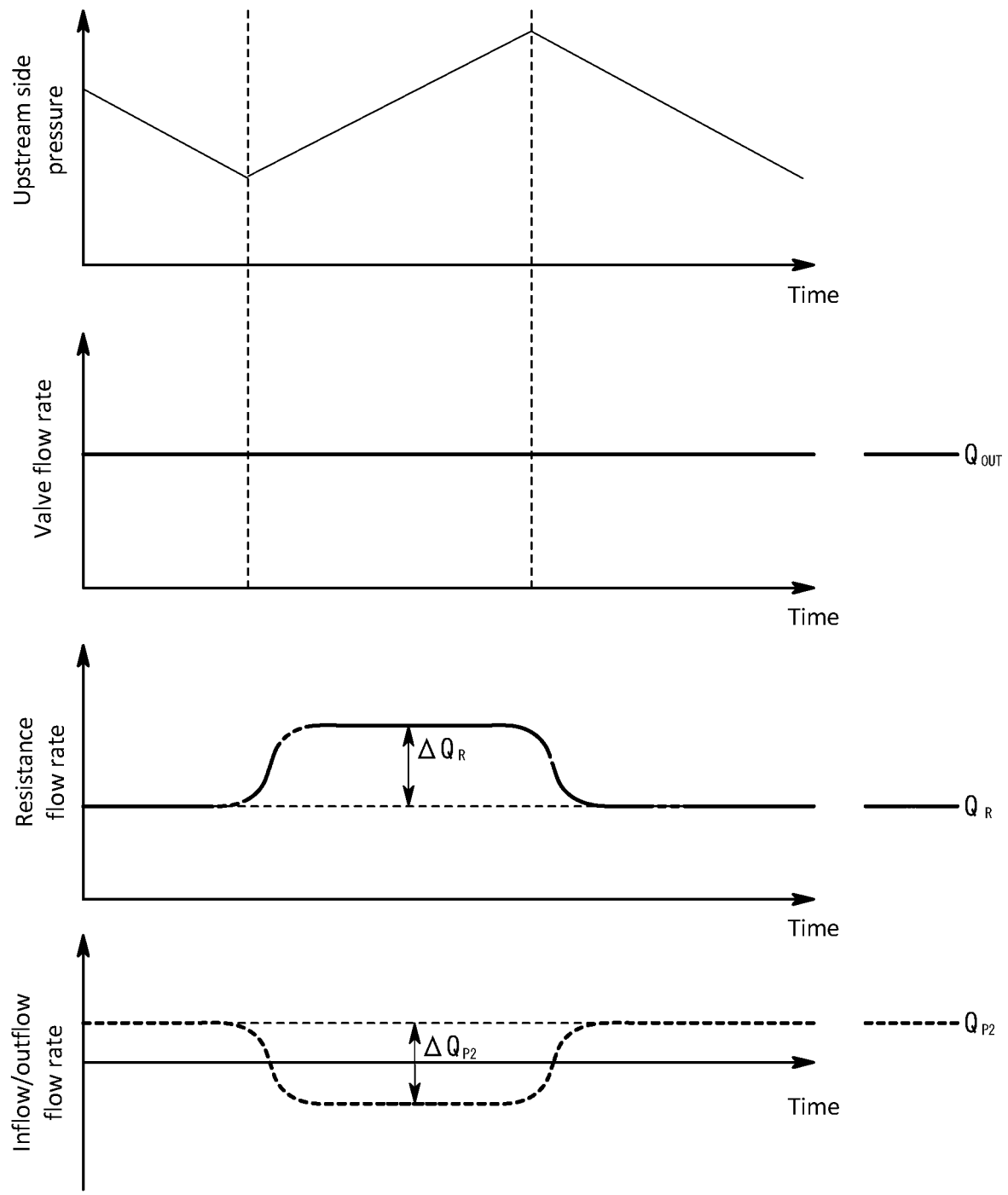
FIG. 2 is a graph illustrating the relationship between changing upstream side pressure, resistance flow rate, inflow/outflow flow rate, and valve flow rate during normal operation.
Figure 3:
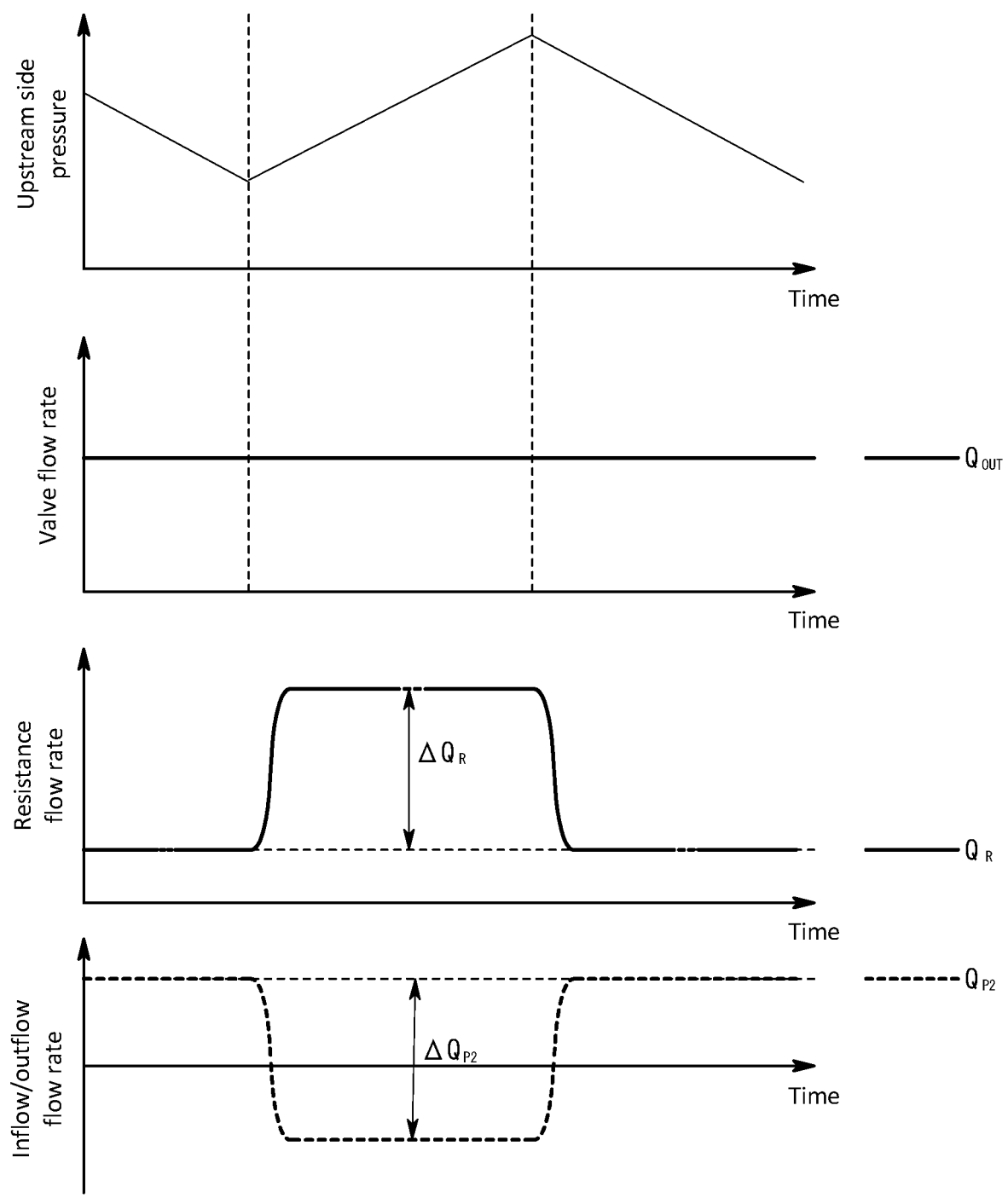
FIG. 3 is a graph illustration the relationship between changing upstream side pressure, resistance flow rate, inflow/outflow flow rate, and valve flow rate during abnormal operation.

The flow control apparatus 100 according to the first embodiment of the present invention is explained making reference to FIG. 1-FIG. 3. The flow control apparatus 100 of the first embodiment is, for example, one made use of for supplying a gas at a set flow rate into an etching chamber for a semiconductor manufacturing process. Here, the set flow rate is a step signal which increases or decreases stepwise from a certain flow rate value to another flow rate value. The flow control device is configured to follow the step signal for a predetermined time in order to ensure the quality of the manufactured semiconductor.

That is, as seen in FIG. 1, the flow control apparatus 100 comprises a fluid device constituted by sensors and valves provided in a flow path, and a control operator COM which controls the fluid device.

A supply pressure sensor P0, an upstream side valve V1, an upstream side pressure sensor P1, a fluid resistor R, a downstream side pressure sensor P2, and a downstream side valve V2 are provided in the flow path in this order from the upstream side. Here, the fluid resistor R is, for example, a laminar flow element, and a differential pressure is generated according to a flow rate of gas flowing before and after it.

The supply pressure sensor P0 is for monitoring the pressure of gas supplied from the upstream side. Moreover, the supply pressure sensor P0 may be omitted in cases where the stability of the supply pressure can be guaranteed and the like.

The upstream side pressure sensor P1 measures an upstream side flow pressure which is the pressure of the gas filling an upstream side volume which is the volume in the flow path between the upstream side valve V1 and the fluid resistor R.

The downstream side pressure sensor P2 measures a downstream side pressure which is the pressure of the gas filling a downstream side volume VL which is the volume in the flow path between the fluid resistor R and the downstream side valve V2.

In this way, the upstream side pressure sensor P1 and the downstream side pressure sensor P2 respectively measure the pressure of the two volumes which are formed by the upstream side valve V1, the fluid resistor R, and the downstream side valve V2. Expressed differently, the upstream side pressure sensor P1 and the downstream side pressure sensor P2 measure the pressure in the respective volumes which are arranged before and after the fluid resistor R.

The upstream side valve V1 and the downstream side valve V2 are of the same type in the first embodiment, and for example are piezo valves in which the valve body is driven into the valve seat by a piezo element. The upstream side valve V1 controls the pressure on the upstream side volume based on the upstream side pressure measured by the upstream side pressure sensor P1. On the other hand, the downstream side valve V2, which is installed the farthest downstream in the fluid device, controls the entire gas flow rate flowing out of the fluid device.

Next, the control operator COM is explained.

The control operator COM is a so-called computer including, for example, a CPU, a memory, an A/D D/A converter, and an input/output means. A program for a flow control apparatus stored in its memory is executed and, by the cooperation of various devices, it functions as a resistance flow rate calculation unit 1, an inflow/outflow flow rate calculation unit 2, a valve flow rate estimation unit 3, a flow rate control unit 4, and a pressure control unit 5, which mainly govern the flow rate control function. Furthermore, the control operator COM also functions as a self-diagnostic mechanism 7 including a pressure command output unit 72, a diagnostic parameter calculation unit 71, a diagnostic unit 74, and a reference value storage unit 73.

First, each part related to flow control is explained in greater detail.

The resistance flow rate calculation unit 1, together with the upstream side pressure sensor P1, the flow resistor R, and the downstream side pressure sensor P2, constitute the flow rate measurement mechanism F, which is a so-called pressure type flow rate sensor. That is, the resistance flow rate calculation unit 1 takes as an input the upstream side pressure measured by the upstream side pressure sensor P1 and the downstream side pressure measured by the downstream side pressure sensor P2, and calculates and outputs a resistance flow rate which is the flow rate flowing through the fluid resistor R. Here, an existing formula can be used by the resistance flow rate calculation unit 1 as the flow rate calculation formula. The resistance flow rate calculated by the resistance flow rate calculation unit 1 continuously changes, but is delayed by a predetermined time with respect to the actual flow rate passing through the downstream side valve V2 achieved by the control of the downstream side valve V2.

The inflow/outflow flow rate calculation unit 2 calculates the inflow/outflow flow rate to or from the inside of the downstream side volume VL which is between the fluid resistor R and the downstream side valve V2. Concretely, because the inflow/outflow flow rate reveals itself in the change in the amount of pressure inside the downstream side volume VL, its value is calculated on the basis of a value measured by the downstream side pressure sensor P2.

The valve flow rate estimation unit 3 calculates a valve flow rate, which is the fluid flow rate flowing out from the downstream side valve V2, on the basis of the resistance flow rate, calculated by the resistance flow rate calculation unit 1, and the inflow/outflow flow rate, calculated by the inflow/outflow flow rate calculation unit 2. More concretely, the valve flow rate estimation unit 3 calculates the valve flow rate on the basis of a constant multiple of the difference between the resistance flow rate, which is the gas flow rate flowing into the downstream side volume VL between the fluid resistor R and the downstream side valve V2, and the valve flow rate, which is the gas flow rate flowing out of the downstream side volume VL, being equal to the amount of change over time of the downstream side pressure.

That the valve flow rate can be calculated on the basis of the resistance flow rate and the inflow/outflow flow rate is explained below.

If the downstream side pressure is $P_2$, the volume of the upstream side volume VL is V, the temperature of the gas is T, the gas constant is R, and the amount of substance is n, then from the equation of state for a gas we have $P_2 = n R T/V$. When the time derivative of this equation is taken, it becomes this:

$$\frac{dP_2}{dt} = \frac{RT}{V}\frac{dn}{dt} \quad \text{(Expression 1)}$$

Further, since the time derivative of the amount of substance is proportional to the gas flow rate flowing into or out of the downstream volume VL per unit time, making the resistance flow rate $Q_R$ and the valve flow rate $Q_{out}$, and with 'a' being a constant, we get the following:

$$\frac{dn}{dt} = a(Q_R - Q_{OUT}) \quad \text{(Expression 2)}$$

And if we solve for the valve flow rate $Q_{out}$ using both expressions, it becomes this:

$$Q_{OUT} = Q_R - A\frac{dP_2}{dt} \quad \text{(Expression 3)}$$

Where A is a function which combines R, T, V, and 'a', and a value obtained by multiplying the amount of change over time of the downstream side pressure with the function A is the inflow/outflow flow rate with respect to the downstream side volume VL. In short, making the inflow/outflow flow rate $Q_{P2}$, we have the following:

$$Q_{out} = Q_R - Q_{P2} \quad \text{(Expression 4)}$$

From this expression, it is evident that it is possible to estimate the valve flow rate by subtracting the inflow/out flow rate, calculated from the time derivative of the downstream side pressure measured by the downstream side pressure sensor P2, from the resistance flow rate, which is a value of the actual measurement made by the flow rate measurement mechanism F.

The flow rate control unit 4 controls the downstream side valve V2 on the basis of a set flow rate set by a user and the valve flow rate inputted from the valve flow rate estimation unit 3. Namely, the flow rate control unit 4, in order to reduce the deviation between the set flow rate and the valve flow rate, controls the downstream side valve V2 via feedback of the valve flow rate which is the gas flow rate flowing out of the downstream side valve V2. Here, the set flow rate is expressed as, for example, a step function, and includes a constant flow rate section in which the target flow rate value is maintained at a constant value.

On the other hand, the pressure control unit 5 controls the upstream side valve V1 on the basis of a set pressure set by a user (below also referred to as the normal set pressure) and the upstream side pressure measured by the upstream side pressure sensor P1. That is, the pressure control unit 5 controls the upstream side pressure via feedback of the upstream side pressure such as to reduce the deviation between the set pressure and the upstream side pressure. Here, the set pressure is set on the basis that the differential pressure should be maintained before and after the fluid resistor R when the valve flow rate is stable in the constant flow rate section of the set flow rate. Moreover, as is explained below, when a diagnosis of the flow rate measurement mechanism F is performed, a diagnostic use set pressure outputted from the pressure command output device 72 is inputted to the pressure control unit 5, and the upstream side valve V1 is controlled such that the upstream side pressure follows the diagnostic use set pressure.

Next, the details of each of the parts constituting the self-diagnostic mechanism 7 will be explained.

The diagnostic parameter calculation unit 71 calculates a diagnostic use parameter based on the resistance flow rate used for estimating the valve flow rate and the inflow/outflow flow rate. This diagnostic use parameter is one used for determining whether or not a measurement error has occurred due to, for example, a blockage in the flow rate measurement mechanism F. Here, the resistance flow rate and the inflow/outflow flow rate are actual measured values from the flow rate measurement mechanism F or the downstream side pressure sensor P2, or values based on them, but they are values for which there has not been direct feedback performed of the control of the upstream side valve V1 or the downstream side V2. In this embodiment, the diagnostic parameter calculation unit 71 is one which calculates as the diagnostic use parameter the absolute value of the deviation between the resistance flow rate and the inflow/outflow flow rate of a pressure change state in which the valve flow rate is controlled to be constant and the upstream side pressure is rising or falling.

Furthermore, the diagnostic use parameter is calculated on the basis of the value when the resistance flow rate and inflow/outflow flow rate are stable for a predetermined period of time. For example, the diagnostic parameter calculation unit 71 calculates a diagnostic parameter when the change ratios of time series data of the resistance flow rate and the inflow/outflow flow rate are respectively within a predetermined percentage.

Here, as an explanation of the special characteristics of the diagnostic use parameter, the resistance flow rate, the outflow/inflow flow rate, and the valve flow rate during a change in the upstream side pressure, in a state where the downstream side valve V2 is controlled so that the valve flow rate is constant, are explained in detail making reference to the graphs in FIG. 2 and FIG. 3. FIG. 2 roughly shows the relationship of the respective variables during normal operation, while FIG. 3 roughly shows the relationship of the respective variables during abnormal operation in which a measurement error is generated in the resistance flow rate due to a blockage or the like. Moreover, in order to make it easy to see the tendency of the changes when the downstream side valve V2 is being controlled so that the valve flow rate is constant, the respective values of the upstream side pressure, resistance flow rate, inflow/outflow flow rate, and valve flow rate shown in the graphs of FIG.

2 and FIG. 3 are exaggerated. Therefore, in actuality, the inflow/outflow flow rate may differ from the resistance flow rate on the order of, for example, 10 to 100 times.

In this embodiment, when a diagnostic command is inputted by the user, the diagnostic use set pressure is inputted to the pressure control part 5 by the pressure command output device 72. As shown in FIG. 2 and FIG. 3, the diagnostic use set pressure changes in, for example, a triangular wave shape, and makes the upstream side pressure repeatedly increase and decrease. In order for this sort of change over time in the upstream side pressure to be realized, the pressure control unit 5 alternatively repeats continuously decreasing and increasing the opening of the upstream side valve V1.

For example, when the opening of the upstream side valve V1 is continuously made to be small, the upstream side pressure decreases. Thereupon, since the differential pressure before and after the fluid resistor R becomes small, the resistance flow rate decreases. Because of this, the flow rate flowing into the downstream side volume VL becomes small, and the valve flow rate flowing out from the downstream side valve V2 tends to become small, but the flow rate control unit 4 operates in order to increase the opening of the downstream side valve V2 to maintain the valve flow rate to be a constant target flow rate value. Consequently, as the valve flow rate flowing out of the downstream side volume VL is maintained to be in a state in which it is larger than the resistance flow rate, the value of the inflow/outflow flow rate becomes large.

Conversely, when the opening of the upstream side valve V1 is continuously made to be large, the upstream side pressure increases. Thereupon, since the differential pressure before and after the fluid resistor R becomes large, the resistance flow rate increases. Because of this, the flow rate flowing into the downstream side volume VL becomes large, and the valve flow rate flowing out from the downstream side valve V2 tends to become large, but the flow rate control unit 4 operates in order to decrease the opening of the downstream side valve V2 to maintain the valve flow rate to be the constant target flow rate value. Consequently, as the valve flow rate flowing out of the downstream side volume VL is maintained to be in a state in which it is smaller than the resistance flow rate, the value of the inflow/outflow flow rate becomes small.

This kind of relationship between each of the parameters will now be explained differently using a mathematical formula. In the pressure change state in which the upstream side pressure is changing, the amounts of change of the valve flow rate, resistance flow rate, and inflow/outflow flow rate are respectively made to be $\Delta Q_{out}$, $\Delta Q_R$, and $\Delta Q_{P2}$. The general relationship from Expression 4 is rewritten as shown below. In this embodiment, the pressure change state refers to before and after the direction of change is reversed from a state where the pressure is increasing to a state where it is decreasing.

$$\Delta Q_{out} = \Delta Q_R - \Delta Q_{P2} \quad \text{(Expression 5)}$$

Here, when the valve flow rate is maintained to be constant by the flow rate control unit 4, we have $\Delta Q_{out}=0$, so that during normal operation the amount of change of the resistance flow rate and the amount of change of the inflow/outflow flow rate becomes equal, as shown below.

$$\Delta Q_R = \Delta Q_{P2} \quad \text{(Expression 6)}$$

On the other hand, as is shown in the graph of FIG. 3, if we make $Q_{R^\wedge}$ be the resistance flow rate in the case where there is a measurement error in the resistance flow rate due to the occurrence of a blockage or the like in the fluid resistor R, and make the resistance flow rate during normal operation be $Q_R$, and the measurement error be $Q_{ERR}$, we can rewrite expression 6 as the following:

$$\Delta Q_{P2} = \Delta Q_{R^\wedge} = \Delta (Q_R + Q_{ERR}) \quad \text{(Expression 7)}$$

That is to say, as seen in the graphs of FIG. 2 and FIG. 3, a difference between during normal operation and when a measurement error occurs appears respectively in the absolute value of the largest amount of change $\Delta Q_R$ of the resistance flow rate before and after an inflection point of the upstream side pressure, or the largest amount of change $\Delta Q_{P2}$ of the inflow/outflow flow rate before and after the inflection point of the upstream side pressure. Therefore, in the present embodiment $\Delta Q_R$ or $\Delta Q_{P2}$ are calculated as the diagnostic parameters by the diagnostic parameter calculation unit 71.

The reference value storage unit 73, for example, stores as the reference value the diagnostic parameter calculated when the flow rate measurement mechanism F is in a normal state, as shown in FIG. 2.

The diagnostic unit 74 diagnoses whether or not an abnormality has occurred on the basis of the diagnostic parameter. Concretely, the diagnostic unit 74 compares the diagnostic parameter calculated by the diagnostic parameter calculation unit 71 and the reference value stored in the reference value storage unit 73, and diagnoses whether or not a measurement error has occurred in the resistance flow rate which has been measured by the flow rate measurement mechanism F. For example, when a difference between the diagnostic parameter and the reference value exceeds a predetermined value, the diagnostic unit 74 determines that an abnormality has occurred in the flow rate measurement mechanism F.

Like this, according to the flow rate control apparatus 100 of the first embodiment, while the valve flow rate realized by the downstream side valve V2 is maintained at the constant target flow rate value, it is possible to concurrently carry out a self-diagnosis of the flow rate measurement mechanism F.

Therefore, it's not necessary, as in conventional devices, to interrupt the supply of gas into the chamber and set a separate maintenance time for diagnosis, and it's possible to continuously diagnosis abnormalities of each device in real time while continuing the semiconductor manufacturing process.

Thanks to this, it is always possible to continuously guarantee that a measurement error has not occurred in the measurement instrument, and it is possible to improve the reliability of the realized valve flow rate.

Figure 4:
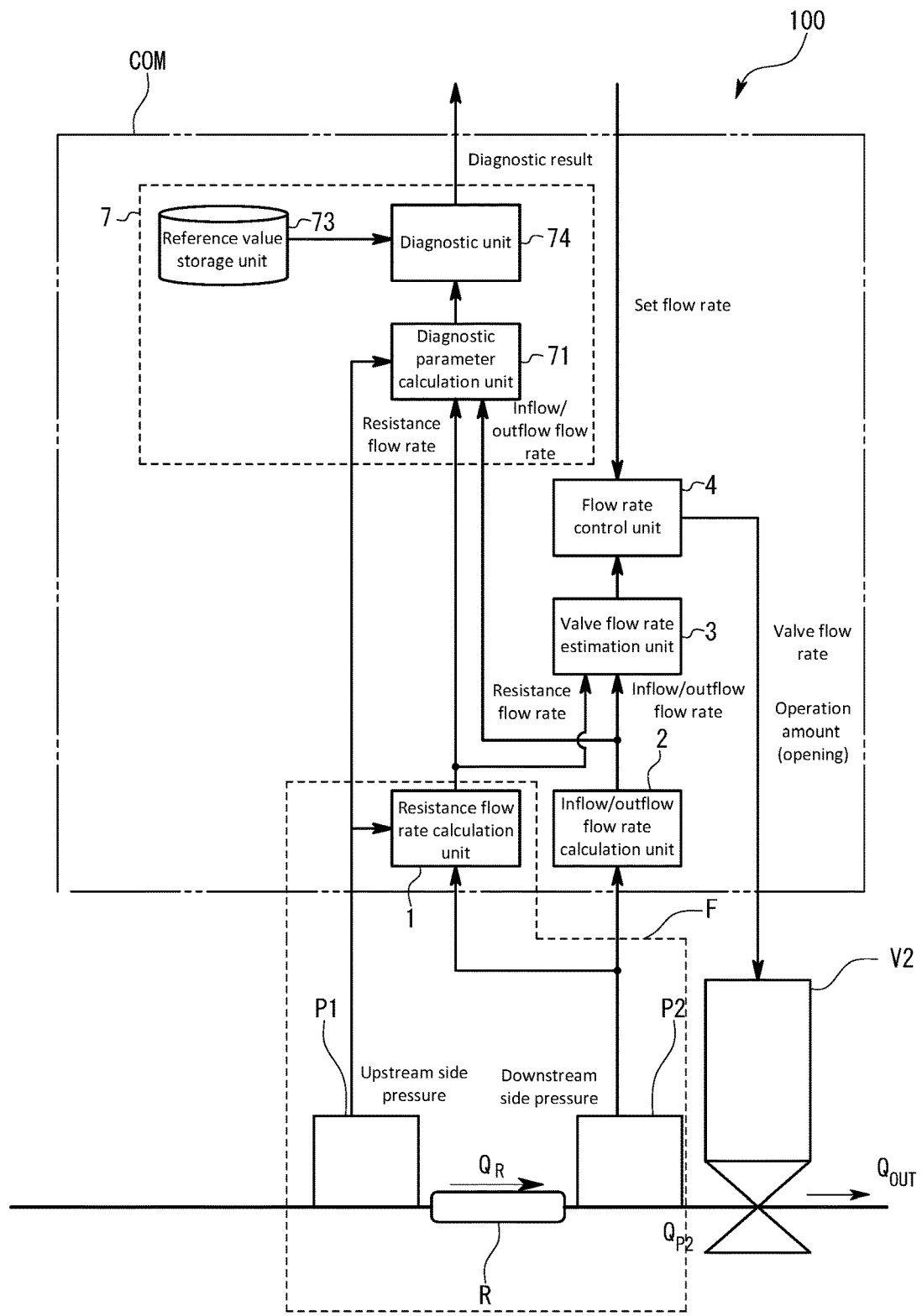
FIG. 4 is a schematic diagram illustrating the flow control device according to the second embodiment of the present invention.

Next, the second embodiment of the present invention is explained making reference to FIG. 4. Moreover, for parts that were explained in the first embodiment, the same reference signs are used.

The second embodiment differs from the flow control device 100 of the first embodiment in that the upside stream side valve V1 and the upstream side pressure sensor P1 are omitted, and other than that the configuration is the same. That is, the change state of the upstream pressure cannot be arbitrarily formed for diagnosis, but, for example, by utilizing the pressure itself of the fluctuation of the gas supplied from the upstream side, a constant target flow rate can be realized by the valve flow rate similarly to in the first embodiment, and it is possible to perform a diagnosis in the diagnostic unit 74.

Other embodiments will now be explained.

The fluid which the flow control device controls is not limited to being a gas, and may also be a liquid.

The diagnostic parameter is not limited to the difference in the resistance flow rate and the difference in the inflow/outflow flow rate in the two states, which are the state of the upstream side pressure increasing and the state of it decreasing. For example, the value of the inflow/outflow flow rate in a state in which the upstream side pressure is increasing may itself be used as the diagnostic parameter. Similarly, the value of the inflow/outflow flow rate in a state in which the upstream side pressure is decreasing may itself be used as the diagnostic parameter. Moreover, using the valve flow rate as a criterion, the difference between the valve flow rate and the resistance flow rate in a pressure change state may be used as the diagnostic parameter. The diagnostic parameter is not limited to being a difference between respective flow rates, but may also be a ratio between the value of the resistance flow rate in a state in which the upstream side pressure is increasing, and the value of the resistance flow rate in a state where the upstream side pressure is decreasing. Similarly, the diagnostic parameter can be a ratio of values of the inflow/outflow flow rate, respectively, in the case wherein the upstream side pressure is increasing and the case wherein the upstream side pressure is decreasing. That is, the diagnostic parameter may be established on the basis of the inflow/outflow flow rate or the resistance flow rate in the pressure change state.

The diagnostic use set pressure is not limited to one with triangular waves, and they may be rectangular waves or sine waves and the like. Furthermore, various wave shapes can be thought of in order to realize the pressure change state.

The diagnostic parameter being calculated is not limited to a case in which the target flow rate of the set flow rate is maintained at a constant value. For example, the diagnostic parameter may be calculated from the inflow/outflow flow rate or the resistance flow rate in a state in which the set flow rate is increasing or decreasing at a fixed rate.

Regarding the flow rate measurement mechanism, it is not limited to one using a pressure formula as explained in the embodiments, and rather it may be based on another measurement principle. Furthermore, the downstream side pressure sensor may not be a part of the flow rate measurement mechanism, but may be installed separately.

Additionally, so long as it is not inconsistent with the object of the present invention, the embodiments may be modified, parts of each embodiment may be combined respectively to form a whole.

INDUSTRIAL APPLICABILITY

Because the present invention is configured such that a diagnostic parameter is calculated on the basis of a resistance flow rate or an inflow/outflow flow rate to estimate a valve flow rate which is the control target, a flow control device can be provided in which it is possible to perform an abnormality diagnosis concurrently with continuing the supply of a desired set flow rate.

What is claimed is:

1. A flow control device comprising:
   a fluid resistor provided in a flow path;
   a downstream side valve provided on a downstream side of the fluid resistor;
   a resistance flow rate measurement mechanism which measures a resistance flow rate which flows through the fluid resistor and which flows into a volume in the flow path between the fluid resistor and the downstream side valve;
   an inflow/outflow flow rate calculation unit which calculates an inflow/outflow flow rate of the fluid into or out of the volume on the basis of a downstream side pressure which is a pressure inside the volume;
   a valve flow rate estimation unit which estimates a valve flow rate, which is a flow rate of the fluid flowing out from the volume and flowing through the downstream side valve, on the basis of the resistance flow rate and the inflow/outflow flow rate;
   a flow rate control unit which controls the downstream side valve so that a deviation between a set flow rate and the valve flow rate becomes small;
   a diagnostic parameter calculation unit which calculates a diagnostic parameter on the basis of the inflow/outflow flow rate or the resistance flow rate in a pressure change state of an increasing or decreasing of an upstream side pressure which is a pressure on an upstream side of the fluid resistor; and
   a diagnostic unit which diagnoses an abnormality on the basis of the diagnostic parameter.

2. The flow control device according to claim 1, wherein the set flow rate includes a constant flow rate section in which a target flow rate value is maintained at a constant value.

3. The flow control device according to claim 1, wherein the resistance flow rate measurement mechanism comprises:
   an upstream side pressure sensor, which is provided on the upstream side of the fluid resistor, and which measures the upstream side pressure which is the pressure on the upstream side of the fluid resistor;
   a downstream side pressure sensor, which is provided between the fluid resistor and the downstream side valve, and which measures the downstream side pressure; and
   a resistance flow rate calculation unit which calculates the resistance flow rate on a basis of the upstream side pressure and the downstream side pressure;
   wherein
   the inflow/outflow flow rate calculation unit is configured to calculate the inflow/outflow flow rate on the basis of the downstream side pressure measured by the downstream side pressure sensor; and
   the diagnostic unit diagnoses an abnormality of the resistance flow rate measurement mechanism.

4. The fluid control device according to claim 1, further comprising:
   a reference value storage unit which stores as a reference value a diagnostic parameter calculated during a normal state, which is calculated by the diagnostic parameter calculation unit; wherein
   the diagnostic unit is one which determines whether or not there is an abnormality by comparing the diagnostic parameter and the reference value.

5. The fluid control device according to claim 1, further comprising:
   an upstream side valve provided on the upstream side of the fluid resistor; and
   a pressure control unit which controls the upstream side valve such that a deviation between a set pressure, which includes a pressure change section where the target pressure value is changing, and the upstream side pressure, which is the actually measured pressure on the upstream side of the fluid resistor, becomes small.

6. The fluid control device according to claim 5, wherein the pressure control unit, during a state in which the downstream side valve is being controlled so that the valve flow rate is constant, continues increasing an opening of the upstream side valve for a fixed period of time, or continues decreasing the opening of the upstream side valve for a fixed period of time.

7. The flow control device according to claim 1, wherein the diagnostic parameter calculation unit calculates the diagnostic parameter in a state in which the resistance flow rate and the inflow/outflow flow rate are respectively stable for a predetermined time.

8. A diagnostic method used for a flow control device comprising a fluid resistor provided in a flow path, a downstream side valve provided on a downstream side of the fluid resistor, and a resistance flow rate measurement mechanism which measures a resistance flow rate which flows through the fluid resistor and which flows into a volume in the flow path between the fluid resistor and the downstream side valve, the diagnostic method comprising:
- an inflow/outflow flow rate calculation step which calculates an inflow/outflow flow rate of a fluid into or out of the volume on the basis of a downstream side pressure which is a pressure inside the volume;
- a valve flow rate estimation step which estimates a valve flow rate which is a flow rate of the fluid flowing out from the volume and flowing through the downstream side valve on the basis of the resistance flow rate and the inflow/outflow flow rate;
- a flow rate control step which controls the downstream side valve so that a deviation between a set flow rate and the valve flow rate becomes small;
- a diagnostic parameter calculation step which calculates a diagnostic parameter on the basis of the inflow/outflow flow rate or the resistance flow rate in a pressure change state of increasing or decreasing of an upstream side pressure which is the pressure on an upstream side of the fluid resistor;
- and a diagnostic step which diagnoses an abnormality on the basis of the diagnostic parameter.

9. A non-transitory recording medium storing a program used for a flow control device comprising a fluid resistor provided in a flow path, a downstream side valve provided on a downstream side of the fluid resistor, and a resistance flow rate measurement mechanism which measures a resistance flow rate which flows through the fluid resistor and which flows into a volume in the flow path between the fluid resistor and the downstream side valve,
wherein the flow control device program causes a computer to function as:
- an inflow/outflow flow rate calculation unit which calculates an inflow/outflow flow rate of a fluid into or out of the volume on the basis of a downstream side pressure which is the pressure inside the volume;
- a valve flow rate estimation unit which estimates a valve flow rate which is a flow rate of the fluid flowing out from the volume and flowing through the downstream side valve on the basis of the resistance flow rate and the inflow/outflow flow rate;
- a flow rate control unit which controls the downstream side valve so that a deviation between a set flow rate and the valve flow rate becomes small;
- a diagnosis parameter calculation unit which calculates a diagnostic parameter on the basis the inflow/outflow flow rate or the resistance flow rate in a pressure change state of an increasing or decreasing of an upstream side pressure which is a pressure of the upstream side of the fluid resistor; and
- a diagnostic unit which diagnoses an abnormality on the basis of the diagnostic parameter.

* * * * *

UNITED STATES PATENT AND TRADEMARK OFFICE
CERTIFICATE OF CORRECTION

| | |
|---|---|
| PATENT NO. | : 11,789,435 B2 |
| APPLICATION NO. | : 17/046249 |
| DATED | : October 17, 2023 |
| INVENTOR(S) | : Kotaro Takijiri, Kentaro Nagai and Tsai Wei Tseng |

It is certified that error appears in the above-identified patent and that said Letters Patent is hereby corrected as shown below:

In the Claims

Column 14, Line 11:
Delete "flow control device"

Signed and Sealed this
Twenty-third Day of January, 2024

*Katherine Kelly Vidal*

Katherine Kelly Vidal
*Director of the United States Patent and Trademark Office*